(12) United States Patent
Chiang (10) Patent No.: US 7,917,023 B2
(45) Date of Patent: Mar. 29, 2011

(54) LENS DRIVING APPARATUS WITH ANTI-SHAKE MECHANISM

(75) Inventor: Shun-Fan Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/637,890

(22) Filed: Dec. 15, 2009

(65) Prior Publication Data

US 2010/0329654 A1 Dec. 30, 2010

(30) Foreign Application Priority Data

Jun. 25, 2009 (CN) .......................... 2009 1 0303660

(51) Int. Cl.
*G03B 17/00* (2006.01)
*H04N 5/228* (2006.01)

(52) U.S. Cl. ..................................... 396/55; 348/208.99
(58) Field of Classification Search .................... 396/55; 348/208.99
See application file for complete search history.

(56) References Cited

U.S. PATENT DOCUMENTS

| 7,663,823 | B2* | 2/2010 | Chung ........................... 359/824 |
| 2007/0268595 | A1* | 11/2007 | Ho et al. ........................ 359/694 |
| 2008/0192124 | A1* | 8/2008 | Nagasaki ................. 348/208.11 |
| 2010/0080545 | A1* | 4/2010 | Fan et al. ......................... 396/55 |
| 2010/0098394 | A1* | 4/2010 | Ishihara et al. ................. 396/55 |
| 2010/0178044 | A1* | 7/2010 | Ohno .............................. 396/55 |
| 2010/0202766 | A1* | 8/2010 | Takizawa et al. ............... 396/55 |

* cited by examiner

*Primary Examiner* — Rodney E Fuller
(74) *Attorney, Agent, or Firm* — Raymond J. Chew (57) ABSTRACT

An exemplary lens driving apparatus includes a first retaining frame having first retaining portions, first coils of wire received in the first retaining portions, and a voice coil motor movably received in the first retaining frame. The voice coil motor includes a second retaining frame having second retaining portions, magnets received in the second retaining portions, and a core member having a second coil of wire wound around and being movably received in the second frame. The core member receives lens therein. The magnets generate magnetic fields which are capable of driving the core member to move along the lens optical axis when the second coil of wire is electrically powered; the magnets are applied reverse force of Ampere's force when the first coils of wire are electrically powered, such that the voice coil motor together with the lens is moved in a plane perpendicular to the lens optical axis.

16 Claims, 7 Drawing Sheets

LENS DRIVING APPARATUS WITH ANTI-SHAKE MECHANISM

BACKGROUND

1. Technical Field

The present disclosure relates to lens driving apparatuses, and particularly, to a lens driving apparatus having an anti-shake mechanism.

2. Description of Related Art

A driving apparatus in a camera module is used to drive a lens to move and thereby provide an auto focus function or a zooming function. A common type of driving apparatus is the voice coil motor (VCM).

A typical voice coil motor includes a hollow core member with a coil of wire wound around it, and a plurality of magnets fixed adjacent to the hollow core member. A lens or a lens module can be received in the core member. When the coil of wire is electrified, magnetic fields generated by the magnets are able to drive the coil of wire together with the core member to move along an optical axis of the lens.

However, with the above-mentioned lens driving apparatus, the lens can only be moved along the optical axis to achieve the auto focus or zooming function. The camera module may be inadvertently displaced (e.g. shaken) during use, with displacement of the lens occurring in transverse directions perpendicular to the optical axis. Such displacement cannot be compensated by the lens driving apparatus's auto focusing or zooming capability. As a result, the image formed on an image sensor of the camera module may be blurred.

What is needed, therefore, is a lens driving apparatus which can overcome the above-described shortcomings.

BRIEF DESCRIPTION OF THE DRAWINGS

Many aspects of the present lens driving apparatus can be better understood with reference to the following drawings. The components in the drawings are not necessarily drawn to scale, the emphasis instead being placed upon clearly illustrating the principles of the present lens driving apparatus. Moreover, in the drawings, like reference numerals designate corresponding parts throughout the several views, and all the views are schematic.

DETAILED DESCRIPTION OF THE EMBODIMENTS

Embodiments of the present lens driving apparatus will now be described in detail below and with reference to the drawings.

Referring to FIGS. 1 to 4, a lens driving apparatus 100 in accordance with a first embodiment is shown. The lens driving apparatus 100 mainly includes a hollow first retaining frame 10, a plurality of first coils of wire 20 mounted at sides of the first retaining frame 10, a voice coil motor 30, two first elastic members 41, and two second elastic members 42. The voice coil motor 30 is suspended and movably received in the first retaining frame 10 by the first and second elastic members 41, 42. Space 36 (see FIG. 3) is maintained between the voice coil motor 30 and the first retaining frame 10 having the first coils of wire 20, to facilitate free movement of the voice coil motor 30 in the first retaining frame 10.

Figure 1:
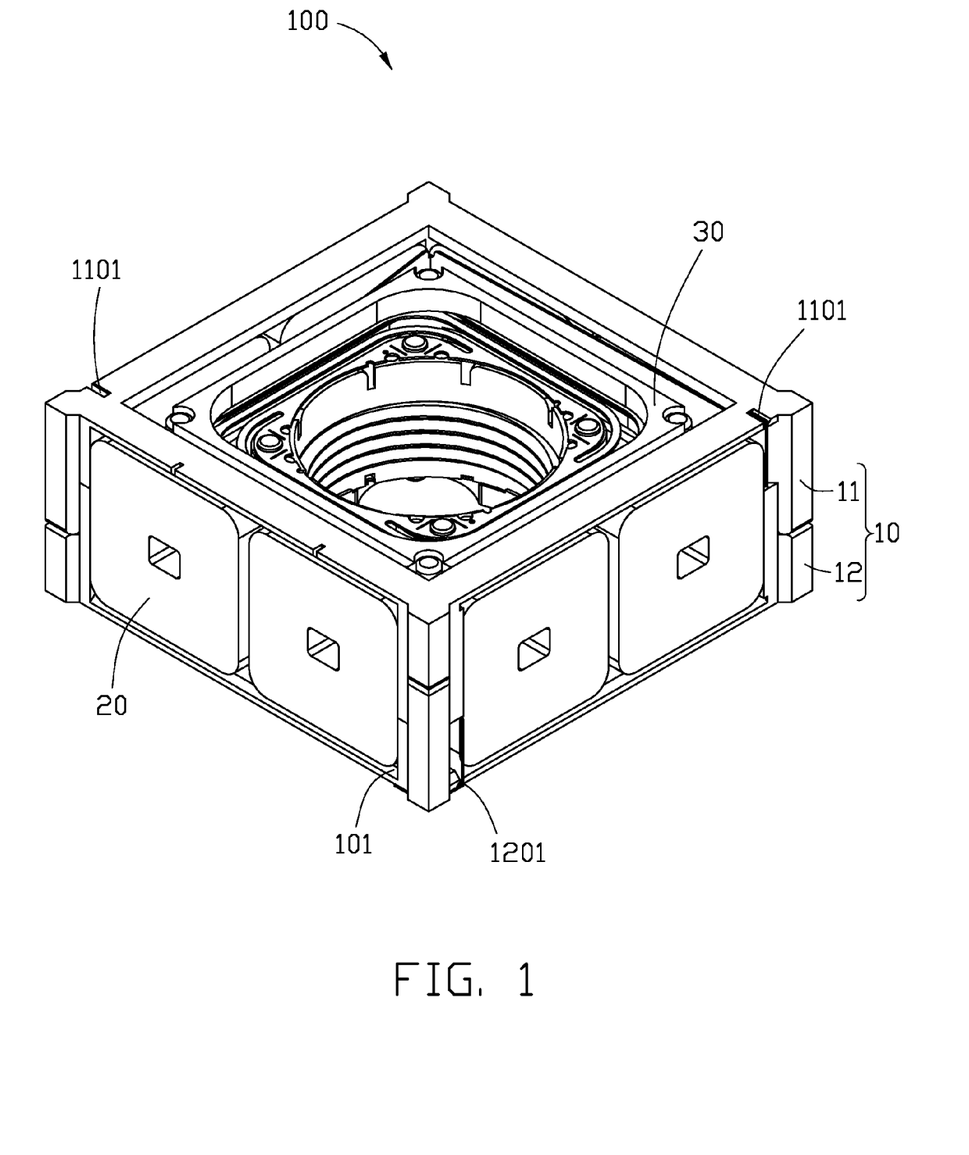
FIG. 1 is an isometric view of a lens driving apparatus in accordance with a first embodiment.
Figure 2:
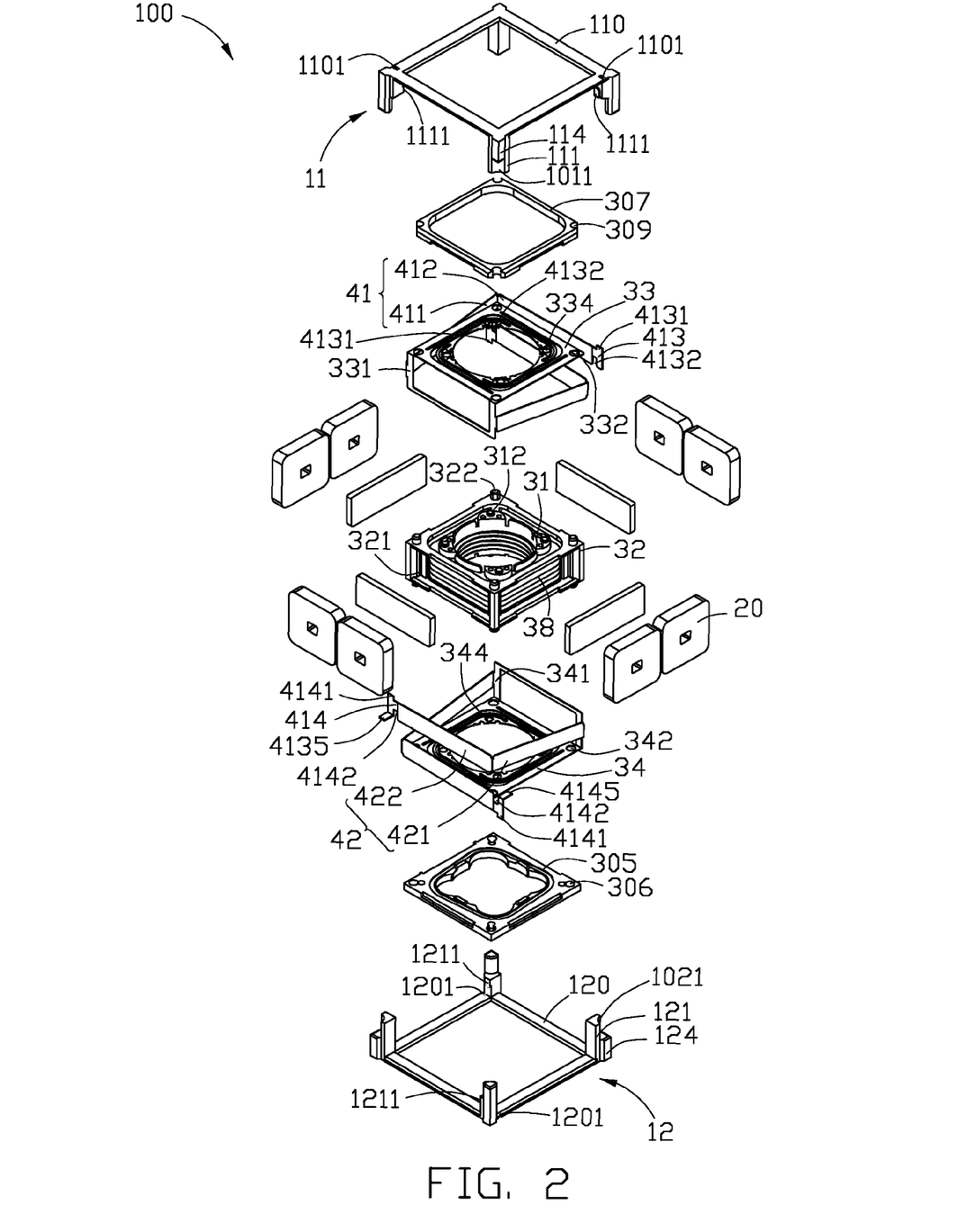
FIG. 2 is an exploded view of the lens driving apparatus of FIG. 1.

The first retaining frame 10 includes an upper portion 11 and a lower portion 12. The upper portion 11 includes four top horizontal beams 110, four first vertical beams 111, and four second vertical beams 114 adjoining the four first vertical beams 111, respectively. The top horizontal beams 110 cooperatively form a square top of the first retaining frame 10, and the first vertical beams 111 and the second vertical beams 114 are connected to four corners of the square top. The first vertical beams 111 are longer than the second vertical beams 114. Among the four first vertical beams 111 and the four second vertical beams 114, two diagonally opposite of the second vertical beams 114 on a first diagonal of the square top are arranged outside of the corresponding two first vertical beams 111, and the other two diagonally opposite second vertical beams 114 on a second diagonal of the square top are arranged inside of the corresponding two first vertical beams 111. Each of the first vertical beams 111 of the first diagonal and the corresponding second vertical beam 114 cooperatively define a recess 1011 located immediately below the second vertical beam 114. Each of the second vertical beams 114 of the second diagonal has a protrusion 1111 formed on a diagonal inner side thereof, with the protrusion 1111 facing a middle of the upper portion 11. Two of the top horizontal beams 110 each have a slot 1101 formed therein. The slots 1101 are generally adjacent to the two second vertical beams 114 of the second diagonal.

The lower portion 12 is configured to couple to the upper portion 11. The lower portion 12 includes four bottom horizontal beams 120 cooperatively forming a square bottom of the first retaining frame 10, four third vertical beams 121, and four fourth vertical beams 124 which adjoin the four third vertical beams 121, respectively. The third vertical beams 121 are longer than the fourth vertical beams 124. Among the four third vertical beams 121 and the four fourth vertical beams 124, two diagonally opposite of the fourth vertical beams 124 on a first diagonal of the square bottom are arranged inside of the corresponding two third vertical beams 121, and the other two diagonally opposite fourth vertical beams 124 on a second diagonal of the square bottom are arranged outside of the corresponding two third vertical beams 121. Each of the third vertical beams 121 of the second diagonal and the corresponding fourth vertical beam 124 cooperatively define a recess 1021 located immediately above the fourth vertical beam 124. Each of the fourth vertical beams 124 of the second diagonal has a protrusion 1211 formed on a diagonal inner side thereof, with the protrusion 1211 facing a middle of the lower portion 12. Two of the bottom horizontal beams 120 each have a slot 1201 formed therein. The slots 1201 are generally adjacent to the two fourth vertical beams 124 of the first diagonal.

A sum of a length of one of the first vertical beams 111 and a length of one of the fourth vertical beams 124 is substantially the same as a sum of a length of one of the second vertical beams 114 and a length of one of the third vertical beams 121. Bottom ends of the two first vertical beams 111 of the second diagonal of the square top are received in the recesses 1021 of the second diagonal of the square bottom and engaged with the corresponding fourth vertical beams 124. Top ends of the two third vertical beams 121 of the first diagonal of the square bottom are received in the recesses 1011 of the first diagonal of the square top and engaged with the corresponding second vertical beams 114. In this way, the upper portion 11 and the lower portion 12 are coupled to each other, and the horizontal beams 110, 120 and the vertical beams 111, 121 of the upper portion 11 and the lower portion 12 cooperatively form four first retaining portions 101 around the periphery of the first retaining frame 10. Each of the first retaining portions 101 is located at a respective side of the first retaining frame 10.

The first coils of wire 20 are retained in the first retaining portions 101, with two of the first coils of wire 20 being arranged in each first retaining portion 101. In the present embodiment, each pair of the first coils of wire 20 arranged in the same first retaining portion 101 have a same current applied thereto (see the arrows in FIG. 4).

The voice coil motor 30 includes a hollow second retaining frame 32, four magnets 35, a hollow core member 31, and a second coil of wire 38. The second retaining frame 32 is substantially cuboid shaped, and includes four top horizontal beams, four bottom horizontal beams, and four vertical beams connected to the top horizontal beams and the bottom horizontal beams. Four protrusions 322 are formed on four corners of the top horizontal beams, and four protrusions 322 are formed on four corners of the bottom horizontal beams. The top horizontal beams, the bottom horizontal beams and the vertical beams cooperatively form four second retaining portions 321 at four sides of the second retaining frame 32. The magnets 35 can be permanent magnets or electromagnets. The magnets 35 are retained in the second retaining portions 321, respectively. The core member 31 is substantially cylindrical shaped. Four guide posts 312 are formed on each of top and bottom ends of the core member 31. A lens or a lens module (not shown) can be received in the core member 31, and an optical axis of the lens (or the lens module) is preferably aligned with a central axis of the core member 31. The second coil of wire 38 is wound around and fixed to the core member 31. In this description, unless the context indicates otherwise, a reference to a "lens" is intended to include a reference to a lens module, and vice versa.

The core member 31 is movably received in the second retaining frame 32. That is, space (not labeled) is maintained between the second retaining frame 32 and the core member 31 having the second coil of wire 38. A first flat elastic sheet 33 and a second flat elastic sheet 34 are mounted to the top and the bottom of the second retaining frame 32, respectively. The first and second flat elastic sheets 33, 34 are metallic, and have a plurality of first through holes 332, 342 and a plurality of second through holes 334, 344 defined therein, respectively. The protrusions 322 of the second retaining frame 32 extend through the first through holes 332, 342. The guide posts 312 of the core member 31 extend through the second through holes 334, 344. The first and second flat elastic sheets 33, 34 are able to avoid excessive movement of the core member 31 in the second retaining frame 32 in directions along the optical axis of the lens. A top fixing member 307 and a bottom fixing member 305 are applied to the top and the bottom of the second retaining frame 32, with the protrusions 322 of the second retaining frame 32 extending through and engaging in through holes 309, 306 of the top and bottom fixing members 307, 305, respectively. The top and bottom fixing members 307, 305 thereby fix the first and second flat elastic sheets 33, 34 on the second retaining frame 32.

The two first elastic members 41 and the two second elastic members 42 are both metallic, and include a first beam 411, 421 and a second beam 412, 422 bent relative to first beam 411, 421, respectively. First ends of the first beams 411 of the first elastic member 41 are connected to opposite ends of a common first elastic frame 331. The first elastic frame 331 includes a horizontal beam and two vertical beams connected to opposite ends of the horizontal beam. The two vertical beams perpendicularly connect to two corners of the first flat elastic sheet 33. First ends of the first beams 421 of the second elastic member 42 are connected to opposite ends of a common second elastic frame 341. The second elastic frame 341 includes a horizontal beam and two vertical beams connected to opposite ends of the horizontal beam. The two vertical beams perpendicularly connect to two corners of the second flat elastic sheet 34.

An acute angle is maintained between a plane defined by each of the first elastic members 41 and a plane of the first flat elastic sheet 33. An acute angle is maintained between a plane defined by each of the second elastic members 42 and a plane of the second flat elastic sheet 34. In the present embodiment, among the two first elastic members 41 and the two second elastic members 42, one of the two first elastic members 41 is upwardly slanted relative to the first flat elastic sheet 33 and is configured to be connected to the upper portion 11 of the first retaining frame 10, and the other first elastic member 41 is downwardly slanted relative to the first flat elastic sheet 33 and is configured to be connected to the lower portion 12 of the first retaining frame 10. One of the two second elastic members 42 is upwardly slanted relative to the second flat elastic sheet 34 and is configured to be connected to the upper portion 11 of the first retaining frame 10, and the other second elastic member 42 is downwardly slanted relative to the second flat elastic sheet 34 and is configured to be connected to the lower portion 12 of the first retaining frame 10.

Two first extensions 413 and two second extensions 414 are formed on second (i.e., free) ends of the first and second elastic members 41, 42, respectively. The first and second extensions 413, 414 each include a horizontal neck horizontally extending from the respective first or second elastic member 41, 42, and a vertical head vertically extending from the horizontal neck.

In one of the first extensions 413 and one of the second extensions 414, which are located at the upwardly slanted first elastic member 41 and upwardly slanted second elastic member 42, respectively, top edges of the horizontal necks are at same levels with top edges of the second beams 412, 422, respectively; and bottom edges of the horizontal necks are above bottom edges of the second beams 412, 422, respectively. First (i.e., top) ends 4131, 4141 of the vertical heads protrude up from the top edges of the corresponding horizontal necks, respectively, and serve as protrusions to engage in the slots 1101 of the upper portion 11. Second (i.e., bottom) ends (not labeled) of the vertical heads, bottom edges of the horizontal necks, and the second ends of the second beams 412, 422 cooperatively form engaging cutouts 4132, 4142, respectively, to engagingly receive the protrusions 1111 of the upper portion 11.

In the other one of the first extensions 413 and the other one of the second extensions 414, which are located at the downwardly slanted first elastic member 41 and downwardly slanted second elastic member 42, respectively, bottom edges of the horizontal necks are at same levels with bottom surfaces of the second beams 412, 422, respectively; and top edges of the horizontal necks are below top edges of the second beams 412, 422, respectively. First (i.e., bottom) ends 4131, 4141 of the vertical heads protrude down from the bottom edges of the horizontal necks, respectively, and serve as protrusions to engage in the slots 1201 of the lower portion 12. Second (i.e., top) ends (not labeled) of the vertical heads, top edges of the horizontal necks, and the second ends of the second beams 412, 422 cooperatively form engaging cutouts 4132, 4142, respectively, to engagingly receive the protrusions 1211 of the lower portion 12. The first ends 4131, 4141 of the vertical heads can be engaged in the slots 1101, 1201 from sides of the slots 1101, 1201.

With the above described configuration, the second retaining frame 32 is suspended in the first retaining frame 10 by the first and second flat elastic sheets 33, 34 and the first and second elastic members 41, 42. A first electrode 4135 and a second electrode 4145 are formed on the two second extensions 414, respectively. Two ends of the second coil of wire 38 are electrically connected to the first electrode 4135 and the second electrode 4145, respectively. When the second coil of wire 38 is electrically powered, the core member 31 having the second coil of wire 38 and the lens can be driven to move along the lens optical axis direction in the second retaining frame 32 due to magnetic fields generated by the magnets 35, such that auto focus function or zooming function is achieved.

Figure 3:
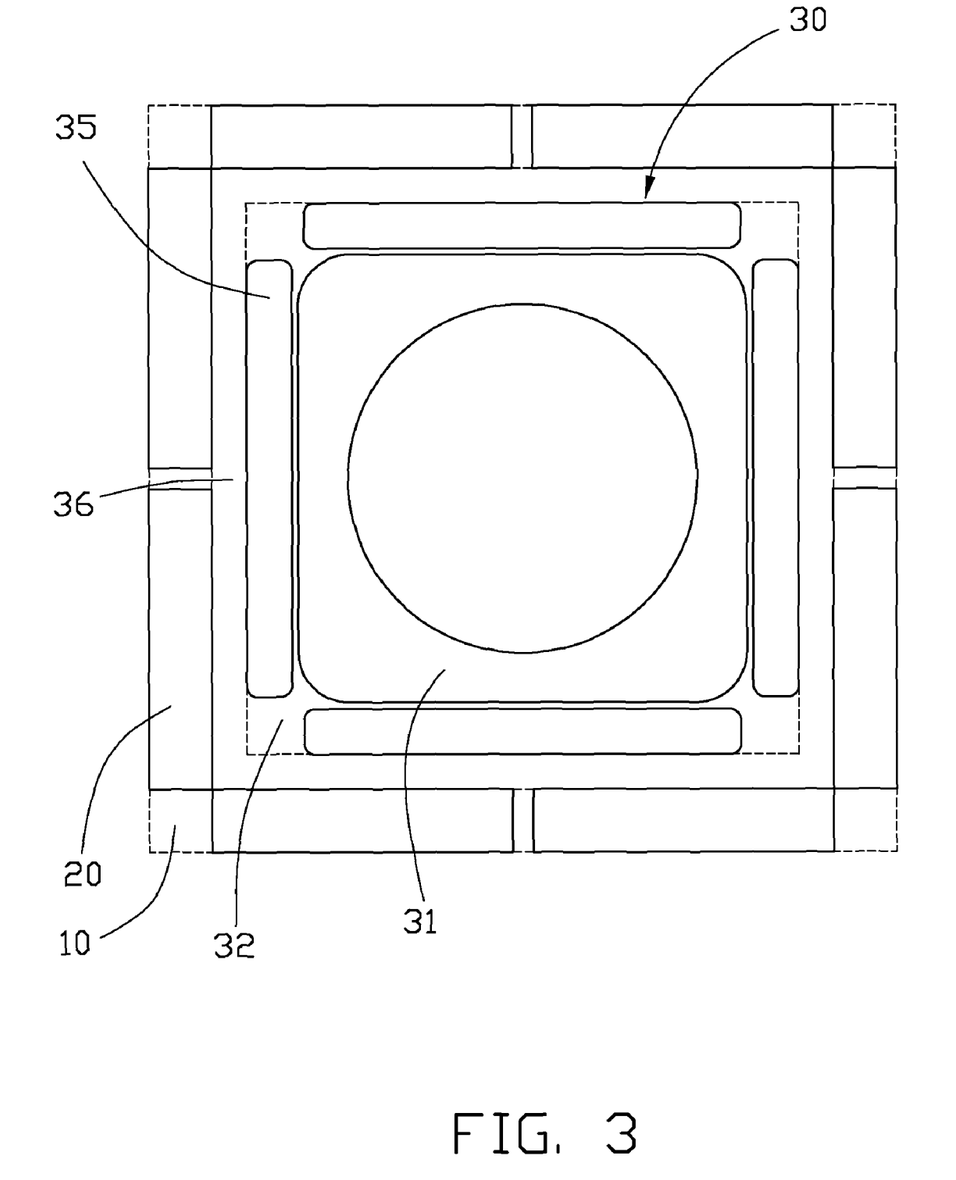
FIG. 3 is a top plan view of certain parts of the lens driving apparatus of FIG. 1, highlighting positional relationships between magnets of a voice coil motor and first coils of wire of a first retaining frame.
Figure 4:
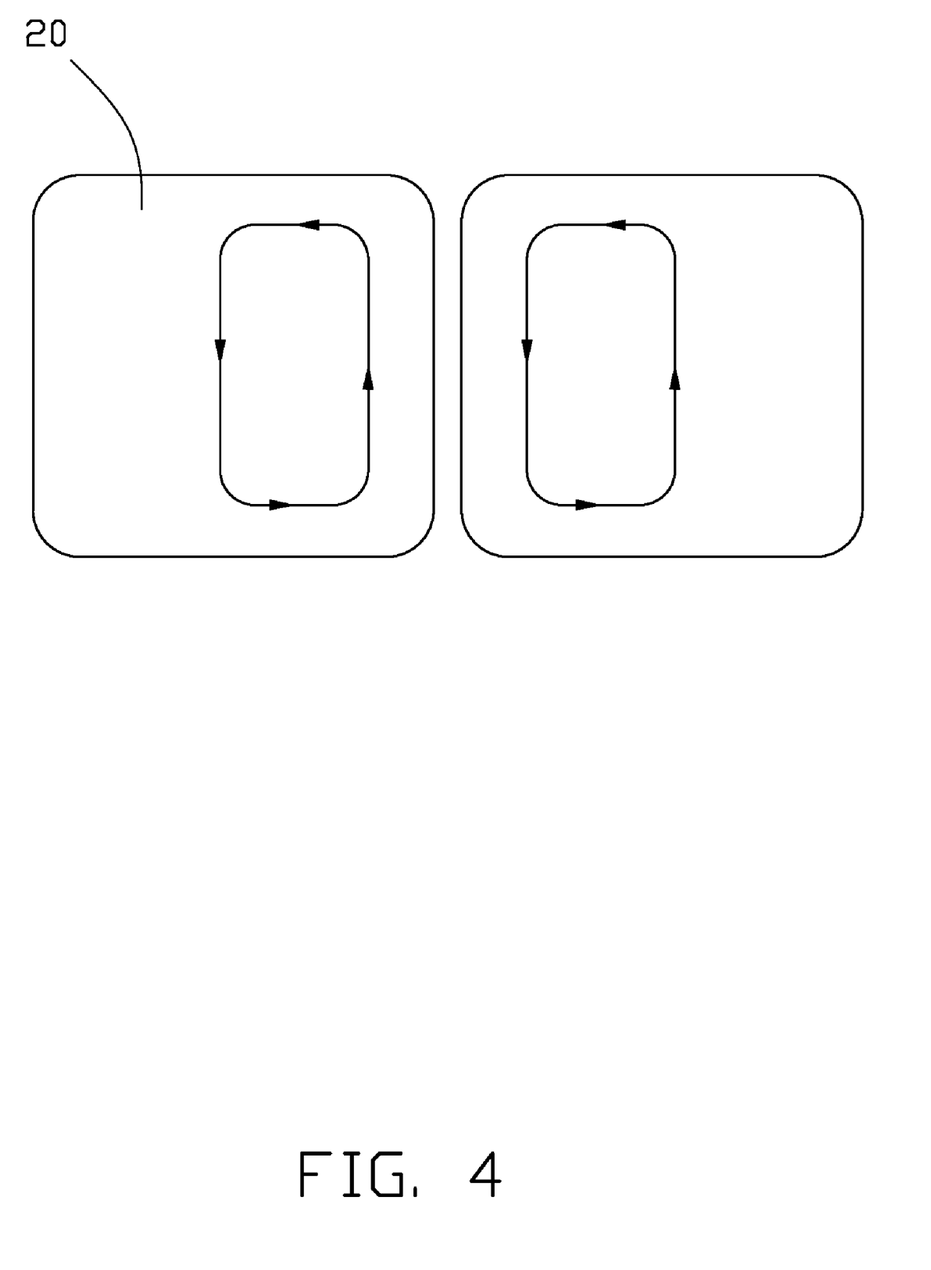
FIG. 4 is a plan view showing a same current applied to two adjacent of the first coils of wire of FIG. 3.

In a typical application, the lens driving apparatus 100 is installed in a camera module (not shown). Unwanted displacement of the camera module may occur in directions other than along the lens optical axis, for example when the camera module is inadvertently shaken by a user. When such displacement happens, corresponding of the first coils of wire 20 are electrically powered via a sensor mechanism (not shown) of the camera module. Each two of the first coils of wire 20 at a same first retaining portion 101 are able to generate a reverse Ampere's force which operates on the corresponding magnet 35 of the second retaining frame 32 in a plane perpendicular to the lens optical axis, such that the core member 31 together with the lens therein is correspondingly moved in the plane perpendicular to the lens optical axis. The sensor mechanism can control any one or more of the first coils of wire 20 in this way, and thereby achieve a desired adjustment of the core member 31 together with the lens therein in the plane perpendicular to the lens optical axis. That is, the position of core member 31 together with the lens therein is adjusted to compensate for the sensed shaking of the camera module. In this way, correction of images capturing by the camera module can be achieved.

Figure 5:
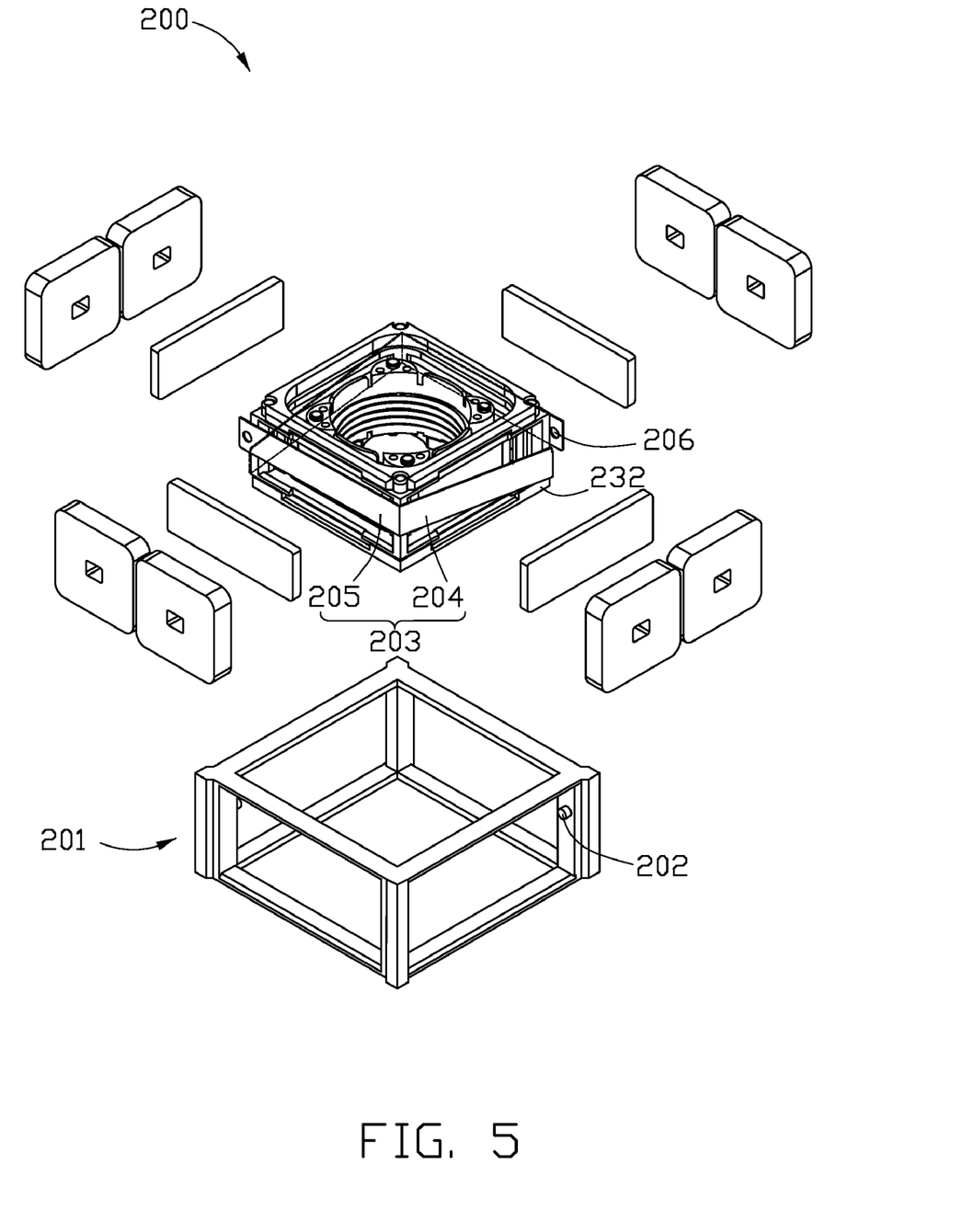
FIG. 5 is an exploded, isometric view of a lens driving apparatus in accordance with a second embodiment.

Referring to FIG. 5, a lens driving apparatus 200 in accordance with a second embodiment is shown. In the lens driving apparatus 200, a first retaining frame 201 and a second retaining frame 232 are similar to the first retaining frame 10 and the second retaining frame 32 of the lens driving apparatus 100. However, the first retaining frame 201 is a single body of material integrally formed. That is, the first retaining frame 201 is a one-piece body. The first retaining frame 201 has a plurality of protrusions 202 formed on vertical beams thereof. Two elastic members 203 are directly provided between the first retaining frame 201 and the second retaining frame 232. The elastic members 203 each include a first beam 204, and a second beam 205 bent relative to the first beam 204. First ends of the first beam 204 of each elastic member 203 are mounted to the second retaining frame 232. Second ends of the second beam 205 of each elastic member 203 each have a through hole 206 defined therein. The through holes 206 engagingly receive the protrusions 202 of the first retaining frame 201, respectively. An optical axis of a lens or lens module (not shown) installed in a core member (not labeled) is preferably aligned with a central axis of the core member. An acute angle is maintained between a plane defined by each elastic member 203 and a plane perpendicular to the axes of the lens (or lens module) and the core member.

Figure 6:
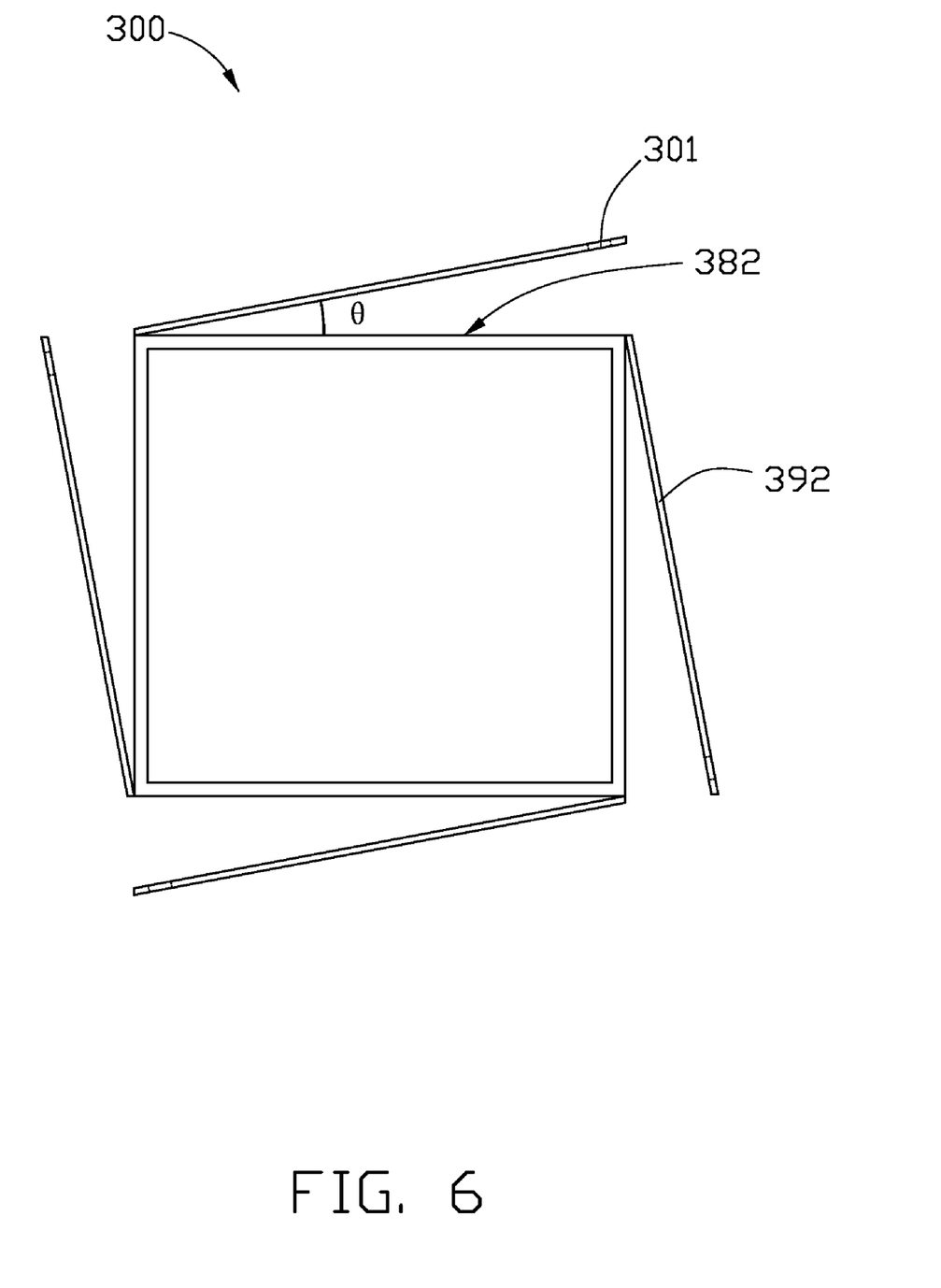
FIG. 6 is a plan view of elongated elastic members each having one end connected to a voice coil motor of a lens driving apparatus in accordance with a third embodiment, the elastic members configured to cooperatively suspend the voice coil motor.

Referring to FIG. 6, a plurality of elastic members 392 of a lens driving apparatus 300 in accordance with a third embodiment are shown. Each of the elastic members 392 has an elongated strip shape. In the present embodiment, each of the elastic members 392 is an elongated plate, with opposite lateral edges of the plate being at opposite top and bottom ends of a voice coil motor (not shown). First ends of the elastic members 392 are connected to a second retaining frame 382 of the voice coil motor. Second ends of the elastic members 392 each have a through hole 301 defined therein. Each through hole 301 can engagingly receive a corresponding protrusion formed on a first retaining frame (not shown). An acute angle θ is maintained between each of the elastic members 392 and a corresponding side surface of the second retaining frame 382. In the present embodiment, each elastic member 392 is oriented in substantially the same horizontal plane that the second retaining frame 382 is oriented in. In an alternative embodiment, each elastic member 392 is not oriented in substantially the same horizontal plane that the second retaining frame 382 is oriented in. That is, each elastic member 392 is tilted relative to the horizontal plane that the second retaining frame 382 is oriented in.

Figure 7:
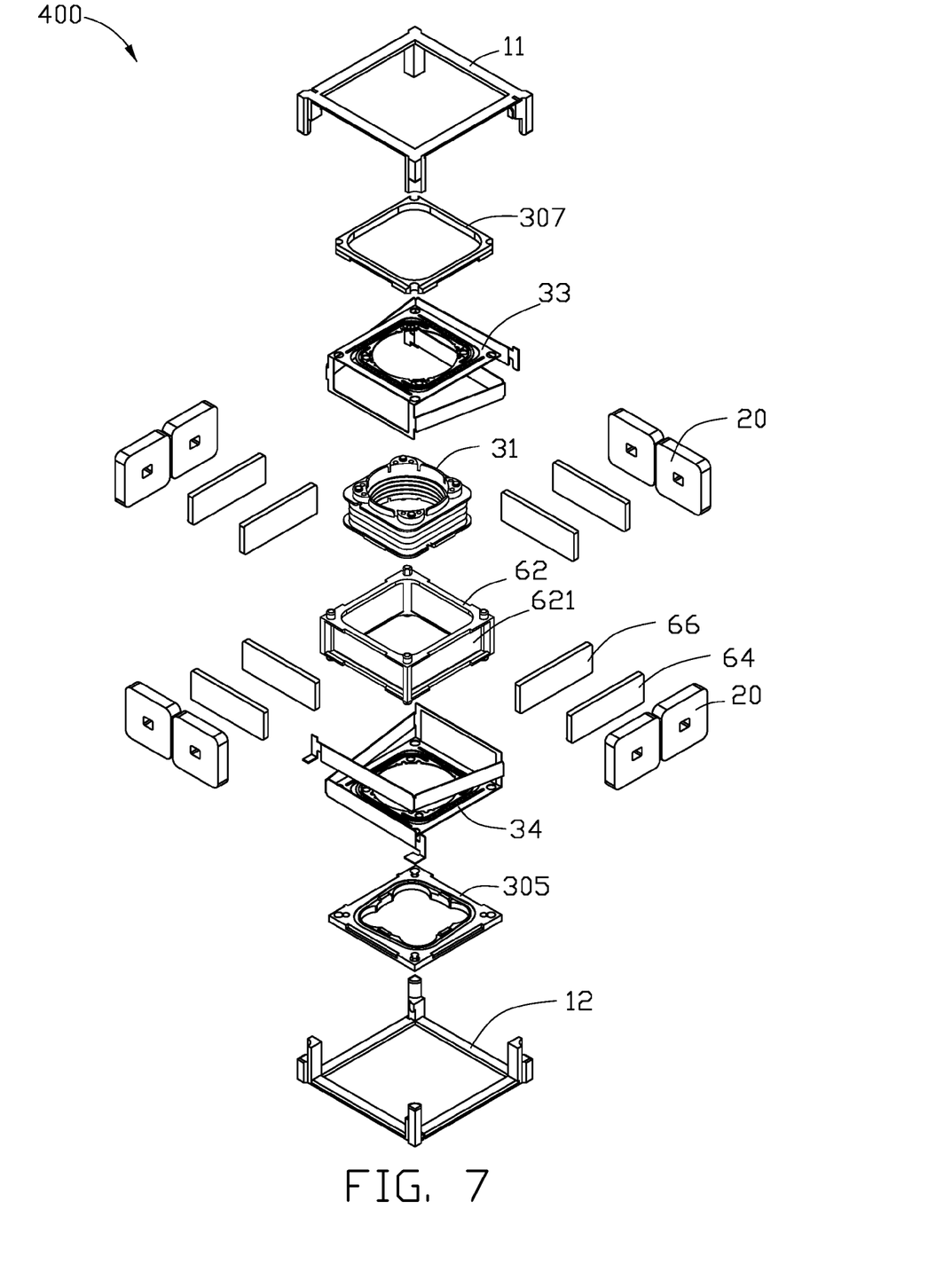
FIG. 7 is an exploded, isometric view of a lens driving apparatus in accordance with a fourth embodiment.

Referring to FIG. 7, a lens driving apparatus 400 in accordance with a fourth embodiment is shown. The lens driving apparatus 400 is essentially similar to the lens driving apparatus 100 illustrated above. However, in the lens driving apparatus 400, a second retaining frame 62 has four sidewalls 621. Four first magnets 64 and four second magnets 66 are mounted at outer surfaces and inner surfaces of the four side walls 621, respectively. The first magnets 64 are subject to being driven by reverse Ampere's force when the first coils of wire 20 are electrically powered. The second magnets 66 are configured for generating magnetic fields which are capable of driving the core member 31 together with a lens or lens module (not shown) therein to move along an optical axis of the lens in the second frame 62. The sidewalls 621 can prevent electromagnetic interference (EMI) between the first magnets 64 and the second magnets 66.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A lens driving apparatus, comprising:
 a hollow first retaining frame defining a plurality of first retaining portions at a plurality of sides thereof;
 a plurality of first coils of wire received in the first retaining portions; and
 a voice coil motor movably received in the first retaining frame, the voice coil motor comprising a hollow second retaining frame, a plurality of magnets, and a hollow core member with a second coil of wire wound around the core member, the second retaining frame defining a plurality of second retaining portions at sides thereof, the magnets being received in the second retaining portions, respectively, the core member being movably received in the second retaining frame and configured for receiving at least one lens therein;
 wherein the magnets are configured for generating magnetic fields which are capable of driving the core member to move along an axis of the second retaining frame when the second coil of wire is electrically powered; and at least one of the magnets is subject to a reverse Ampere's force when one or more corresponding of the first coils of wire is electrically powered, such that the second retaining frame together with the at least one lens is moved in a plane substantially perpendicular to an axis of the first retaining frame.

2. The lens driving apparatus as described in claim 1, wherein the first retaining frame and the second retaining frame are generally cuboid, each of the first and second retaining frames comprises a plurality of horizontal beams and a plurality of vertical beams, and the horizontal beams and the vertical beams cooperatively form the first and second retaining portions.

3. The lens driving apparatus as described in claim 1, further comprising a first and a second hollow flat elastic sheets, which are mounted to top and bottom ends of the second retaining frame, respectively, the top and the bottom ends being opposite from each other along a direction of the axis of the second retaining frame, the first and second flat elastic sheets each have through holes defined therein, the core member has guide posts formed on each of two opposite ends thereof, and the guide posts extend through the through holes.

4. The lens driving apparatus as described in claim 3, further comprising two first elastic members and two second elastic members between the first retaining frame and the second retaining frame; wherein the first retaining frame comprises an upper portion and a lower portion coupled to each other; each of the first elastic members has a first end and an opposite second end, the first ends of the first elastic members are connected to the first flat elastic sheet, the second end of one of the first elastic members is connected to the upper portion of the first retaining frame, and the second end of the other first elastic member is connected to the lower portion of the first retaining frame; and each of the second elastic members has a first end and an opposite second end, the first ends of the second elastic members are connected to the second flat elastic sheet, the second end of one of the second elastic members is connected to the upper portion of the first retaining frame, and the second end of the other second elastic member is connected to the lower portion of the first retaining frame.

5. The lens driving apparatus as described in claim 4, wherein the first and second elastic members each comprise a first beam and a second beam bent relative to first beam, the first beams of the first elastic members are connected to the first flat elastic sheet by a first elastic frame comprising a horizontal beam parallel to the first flat elastic sheet and two vertical beams connected to and perpendicular to the first flat elastic sheet; and the first beams of the second elastic members are connected to the second flat elastic sheet by a second elastic frame comprising a horizontal beam parallel to the second flat elastic sheet and two vertical beams connected to and perpendicular to the second flat elastic sheet.

6. The lens driving apparatus as described in claim 5, wherein an acute angle is maintained between a plane where one of the first elastic members is located and a plane where the first flat elastic sheet is located, an acute angle is maintained between a plane where the other first elastic member is located and the plane where the first flat elastic sheet is located, an acute angle is maintained between a plane where one of the second elastic members is located and a plane where the second flat elastic sheet is located, and an acute angle is maintained between a plane where the other second elastic members is located and the plane where the second flat elastic sheet is located.

7. The lens driving apparatus as described in claim 4, wherein two first extensions and two second extensions are formed on the second ends of the first and second elastic members, respectively; the first and second extensions each comprise a horizontal neck horizontally extending from the respective first elastic member or second elastic member, and a vertical head vertically extending from the horizontal neck, first ends of the vertical heads of the first and second extensions are configured as protrusions which engage in slots defined in the upper portion and the lower portion of the first retaining frame, respectively, an opposite second end of each of the vertical heads, the corresponding horizontal neck, and the corresponding second end of the corresponding first or second elastic member cooperatively form an engaging cutout, and the engaging cutouts of the first and second extensions engagingly receive protrusions formed on the upper portion and the lower portion of the first retaining frame, respectively.

8. The lens driving apparatus as described in claim 7, wherein a first electrode and a second electrode are formed on the second extensions of the second elastic member, respectively, and two ends of the second coil of wire are electrically connected to the first and second electrodes.

9. The lens driving apparatus as described in claim 1, further comprising a plurality of elastic members between the first retaining frame and the second retaining frame, with first ends of the elastic members connected to the second retaining frame, and second ends of the elastic members connected to the first retaining frame.

10. The lens driving apparatus as described in claim 9, wherein an acute angle is respectively maintained between a plane where each one of the elastic members is located and a plane perpendicular to the axis of the second retaining frame.

11. The lens driving apparatus as described in claim 9, wherein an acute angle is respectively maintained between a plane in which each one of the elastic members is located and a corresponding sidewall of the second retaining frame.

12. A lens driving apparatus, comprising:
a hollow first retaining frame having four hollow sides;
a plurality of first coils of wire received in the sides of the first retaining frame;
a hollow second retaining frame movably received in the first retaining frame and suspended in the first retaining frame by a plurality of elastic members, the second retaining frame having four sides;
a plurality of first magnets being mounted at the sides of the second retaining frame; and
a voice coil motor received in the second retaining frame and comprising a hollow core member, the core member configured for receiving at least one lens therein, the voice coil motor configured for driving the core member to move along an axis of the second retaining frame;
wherein when unwanted displacement of the core member in a direction substantially perpendicular to the axis occurs in use of the lens driving apparatus, one or more of the first coils of wire is capable of being electrically powered, and one or more corresponding of the first magnets are thereby subjected to reverse Ampere's forces along one or more component directions substantially perpendicular to the axis, such that the first magnets together with the second retaining frame and the voice coil motor are moved in the first retaining frame along one or more component directions substantially perpendicular to the axis.

13. The lens driving apparatus as described in claim 12, wherein the voice coil motor further comprises a plurality of second magnets and a second coil of wire wound around the core member, the first magnets are mounted at outer areas of the sides of the second retaining frame, the second magnets are mounted at inner areas of the sides of the second retaining frame and are spaced apart from the corresponding first magnets, and the second magnets are configured for generating magnetic fields which are capable of driving the core member to move in the second retaining frame along the axis of the second retaining frame.

14. The lens driving apparatus as described in claim 13, wherein each of the sides of the second retaining frame comprises a partition wall separating the outer area of the side from the inner area of the side, and the first magnets are separated from the corresponding second magnets by the corresponding partition walls of the sides of the second retaining frame.

15. The lens driving apparatus as described in claim 13, further comprising a first and a second hollow flat elastic sheets, which are mounted to top and bottom ends of the second retaining frame, respectively, the top and the bottom ends being opposite from each other along a direction of the axis of the second retaining frame, the first and second flat elastic sheets each have through holes defined therein, the core member has guide posts formed on each of two opposite ends thereof, and the guide posts extend through the through holes.

16. The lens driving apparatus as described in claim 15 wherein the plurality of elastic members comprises two first elastic members connected to the first hollow flat elastic sheet, and two second elastic members connected to the second hollow flat elastic sheet, an acute angle is maintained between a plane where one of the first elastic members is located and a plane where the first flat elastic sheet is located, an acute angle is maintained between a plane where the other first elastic member is located and the plane where the first flat elastic sheet is located, an acute angle is maintained between a plane where one of the second elastic members is located and a plane where the second flat elastic sheet is located, and an acute angle is maintained between a plane where the other second elastic member is located and the plane where the second flat elastic sheet is located.

* * * * *